Nov. 8, 1960 E. J. KRACK 2,958,986

APPARATUS FOR GRINDING A MAGNETIC SIGNAL TRANSDUCING HEAD

Filed Aug. 18, 1959

INVENTOR.
ELMER J. KRACK
BY
[signature]
ATTORNEY

United States Patent Office 2,958,986

Patented Nov. 8, 1960

2,958,986

APPARATUS FOR GRINDING A MAGNETIC SIGNAL TRANSDUCING HEAD

Elmer J. Krack, Penn Hills Township, Allegheny County, Pa., assignor to Gulf Research & Development Company, Pittsburgh, Pa., a corporation of Delaware Filed Aug. 18, 1959, Ser. No. 834,618

9 Claims. (Cl. 51—98)

This invention relates to apparatus for grinding-in a magnetic recording-reproducing head. In particular this invention relates to apparatus for holding the magnetic head in proper orientation during the grinding-in process so that the sides of its magnetic gap are accurately parallel to the axis of the grinding and polishing wheel employed.

A magnetic recording-reproducing head is a well-known structure comprising a magnetic core linked by a coil and having a short magnetic gap in the magnetic circuit. A magnetic recording medium is caused to traverse the magnetic gap usually at right angles thereto and in contact with the magnetic core. Variations in the magnetic flux of the core caused by changes in the current flowing in the coil produce a magnetic record in the form of varying magnetization of the recording medium and the record may subsequently be played back through a similar recording-reproducing head by means of well-known techniques. Some such magnetic transducing heads have a convex operating surface across the magnetic gap and the recording medium traverses the head in the form of a band or tape moving from a supply reel to a take-up reel. In certain other types of magnetic recording-reproducing apparatus, the magnetic record is of shorter length and it is more convenient to mount the record on a drum so that upon rotation of the drum past the magnetic transducing head the necessary recording or reproducing operation takes place. Such a magnetic transducing head has a small concave operating surface that engages the cylindrical surface of the magnetic record wound on the drum.

One of the advantages of magnetic recording system lies in the fact that it is possible to faithfully record high frequencies. It is evident that at nominal tape speeds the wave length of a high-frequency signal is very short, and it is further evident that faithful recording of high frequencies requires the use of a very short magnetic gap in the magnetic transducing head, the gap usually being less than a thousandth of an inch wide. For faithful recording of high frequencies it is further required that the two sides of the magnetic gap be accurately at right angles to the magnetic track on the recording medium. When the magnetic record medium is mounted on a rotating drum, this becomes equivalent to requiring that the sides of the magnetic gap be accurately parallel to the axis of rotation of the drum on which the record is mounted.

It is well-known that the recording medium must be in close contact with the poles of the magnetic transducing head. In order to insure this condition it is customary to "grind-in" the magnetic head. The grinding-in comprises a grinding and polishing operation that produces the proper convex or concave operating surface. As herein used the term grinding-in includes a final polishing operation. In the case of a head to be used with a long magnetic tape, the convex operating surface has an axis at right angles to the magnetic track. In the case of a head to be used with a record mounted on a drum, the grinding-in process produces on the upper surface of the head a slight cylindrical concavity. It is apparent that in order to meet the condition of close contact between the magnetic head and the magnetic medium on a drum, it is necessary to orient the magnetic gap of the magnetic transducing head during the grinding-in process in such manner that the sides of the magnetic gap are accurately parallel to the rotation axis of the grinding wheel employed, so that when the finished head is mounted against the actual record with which it is to be used, the operator can adjust the head so that the sides of its magnetic gap are accurately parallel to the axis of the recording drum and at the same time be sure that the axis of the concave cylindrical operating surface of the head will also be parallel to the axis of the recording drum.

It is the purpose of this invention to provide apparatus with which a cylindrical surface may be ground on the operating face of a magnetic transducing head in such manner that the axis of the cylindrical surface is accurately parallel to the sides of the magnetic gap.

The invention will be described with reference to the accompanying drawings which form a part of this specification and in which Figure 1 shows an enlarged view of a typical magnetic transducing head;

Figures 1, 2, 3, 4, 5:
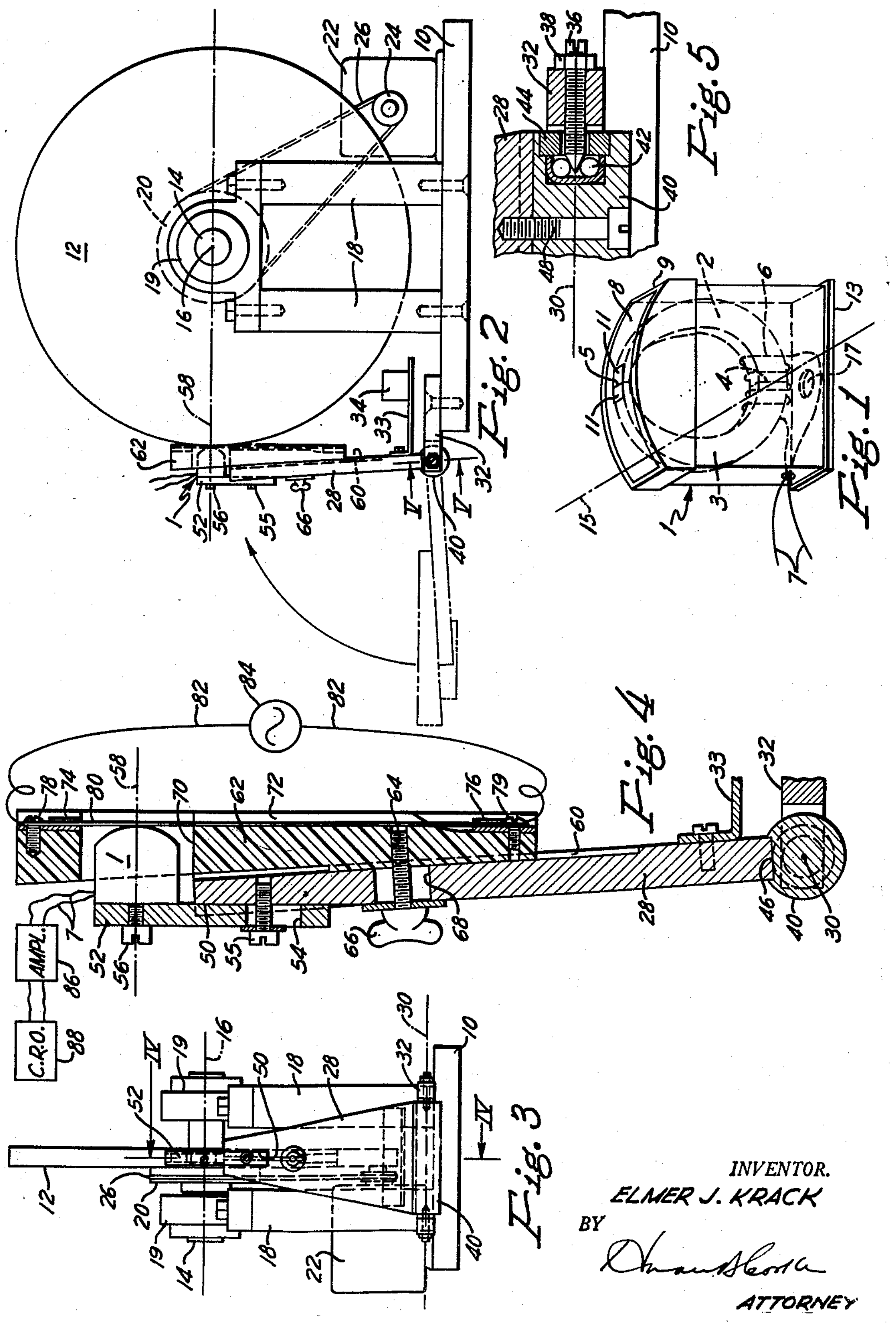
Figure 2 shows a side view of the apparatus of this invention.
Figure 3 shows an end view of the apparatus of this invention.
Figure 4 shows an enlarged side view of the arm on which the transducing head is mounted.
Figure 5 shows an enlarged view of the pivot bearing on which the arm is hinged.

The invention comprises a base plate on which there is rotatably mounted a grinding and polishing wheel of the same diameter as the cylindrical surface to which the magnetic head is to be ground. Hinged on the base is an arm on which the magnetic head may be mounted. By swinging the arm toward the grinding wheel the magnetic head may be brought into contact with the grinding wheel to perform the necessary grinding-in operations. The axis of the hinge by which the arm is mounted on the base is accurately parallel to the rotation axis of the grinding wheel. The arm has a groove cut therein in an orientation accurately at right angles to the hinge axis, that is to say the center line of the groove lies in the same plane for all positions of the arm, this plane being at right angles to the hinge axis. This geometry provides that the center line of the groove is always accurately perpendicular to the axis of the grinding wheel. A removable fixture is provided that may be placed in the groove and fastened to the arm and which is accurately oriented by the groove. The fixture has a fine nonmagnetic wire mounted thereon parallel to the groove and arranged so that the wire nearly contacts the magnetic head mounted on the hinged arm. Upon passing an alternating electric current through the wire, a signal is developed in the magnetic head except when the sides of the magnetic gap are exactly at right angles to the wire. The magnetic head may be rotated on its base until a minimum signal is generated in the head by the alternating current in the wire. When this condition is attained, the sides of the magnetic gap are at right angles to the wire, and since the wire is always at right angles to the axis of the grinding wheel, this results in the sides of the magnetic gap being accurately parallel to the axis of the grinding wheel. The magnetic head is clamped to the arm in this orientation after which the fixture is removed. The hinged arm is then swung to bring the magnetic head into engagement with the grinding wheel to perform the grinding and polishing operations. The apparatus thus insures that the cylindrical operating surface of the magnetic head is correctly oriented with respect to the magnetic gap. The finished head can subsequently be accurately oriented in its recording-reproducing position with respect to the record track by customary well-known techniques.

Figure 1 is a diagrammatic representation of a typical magnetic transducing head 1 of known type. The device illustrated in Figure 1 is well known in the art and does not per se form a part of this invention. The device comprises a magnetic core made in the form of two C-shaped sections 2 and 3 made of laminations of high permeability magnetic alloy in well-known manner. The core sections 2 and 3 abut each other at the joint 4 and are separated by a small magnetic gap at the joint 5. The spacing of the poles at the magnetic gap 5 is usually very small and may be less than $1/1,000$ of an inch. The spacing of the magnetic gap 5 is usually fixed by a thin shim of nonmagnetic material placed in the gap. The pole surfaces of the core sections which form the magnetic gap 5 are substantially at right angles to the plane of the C-shaped core sections. However, the thickness of the core sections 2 and 3 is usually $1/16$ of an inch or less and the cores are not necessarily mounted accurately parallel to the sides of the casing in which the core assembly is housed. When the core sections are assembled a coil 6 is linked with the core, and the coil ends are brought out as leads 7. The core and coil assembly is customarily encased in a nonmagnetic electrically conducting shell 8, usually made of brass or copper, which serves to prevent leakage of A.-C. flux from the core. Outside of the nonmagnetic shell 8 there is usully placed an outer shield 9 of magnetic material, such as high permeability alloy, which serves to further shield the device from external stray fields and prevents cross-talk with neighboring magnetic heads. The magnetic core sections 2 and 3 are exposed for a short distance on each side of the magnetic gap 5 to provide pole areas 11 adjacent to the magnetic gap 5. In operation, the varying magnetization of the core caused by varying currents in the coil 6 produces across the magnetic gap 5 a varying flux that is impressed on the recording medium. A magnetic medium traversing the pole areas 11 in a direction at right angles to the sides of the magnetic gap 5 will be magnetized in accordance with the varying magnetization as is well known. The outer magnetic shield 9 may be somewhat thicker at the upper end and may also be provided with a ledge 13 near the base surface as shown in Figure 1 to provide means by which the unit may be clamped or otherwise mounted in a holder in the recording apparatus in which it is to be used. Alternatively the base of the magnetic head may be provided with a tapped hole 17 (shown dotted in Figure 1) in the bottom of the base surface so that the unit may be held against a mounting plate by means of a screw. As previously indicated, the pole areas 11 must be ground to a cylindrical surface whose axis is parallel to the sides of the magnetic gap 5. For a head that is to be used with a spooled magnetic tape which traverses the pole areas 11, the axis of the convex cylindrical surface is illustrated by the center line 15 in Figure 1. For such a magnetic head it is important that the convex cylindrical surface of the pole areas 11 be that of a smooth cylinder whose axis (indicated by line 15) is parallel to the sides of the gap 5. Unless this criterion is met, the tape in traversing the upper surface of the head may be warped and may not conform exactly to the head surface even though the sides of the magnetic gap 5 are at right angles to the magnetic track.

On the other hand, for a magnetic head that is to be used against a magnetic record that is mounted on a drum, the head must contact the record (drum) at the magnetic gap 5 and have at the gap a cylindrical concavity that fits the drum. Such a concavity would ordinarily be quite small and is not shown on Figure 1. The axis of the required cylindrical concavity will lie above the head 1 a distance substantially equal to the radius of the drum against which the head is to be used, and the axis of the concavity must be parallel to the sides of the magnetic gap 5. During the reproducing or recording operation the head 1 must be adjusted so that the sides of the magnetic gap 5 are accurately parallel to the axis of the drum. It is apparent that if the axis of the concavity is not also parallel to the axis of the drum, the former adjustment will lift the magnetic transducing head off the record by a slight amount, and this is known to have a serious adverse effect on high frequency response. The criterion of parallelism between the operating surface of a magnetic transducing head when used with a long magnetic record and the direction of record traverse, or of the axis of the cylindrical concavity and the axis of the drum on which a short magnetic record is mounted, is particularly sensitive when the magnetic head is used for recording and reproducing frequency-modulated signals because the carrier frequency is usually quite high and the slightest space between the record and the head at the gap 5 will result in imperfect reproduction. The primary purpose of this invention is to provide apparatus for grinding the cylindrical surface (either convex or concave) so that its axis is accurately parallel to the sides of the magnetic gap.

The invention will be described in an embodiment that is adapted to grind a cylindrical concavity in a magnetic transducing head to be used with a magnetic record on a drum. Referring to Figure 2, the apparatus of this invention comprises a substantially rigid base 10 on which is rotatably mounted a grinding and polishing wheel 12 which in the embodiment described is in the form of a short cylinder of the same diameter as the record drum with which the transducing head 1 is to be used. Around the narrow cylindrical outer surface of wheel 12 there is applied a band of abrasive material, successively gradually finer abrasives being employed as is customary for developing a fine polish. Wheel 12 is mounted on a shaft 14 whose rotation axis 16 (perpendicular to the plane of Figure 2) is important and will be referred to later. The shaft 14 is journaled in antifriction bearings in conventional manner, the bearings being held in bearing housings 19 on each side of the wheel 12 as best seen in Figure 3. Each bearing housing 19 is supported on the base 10 by means of substantially rigid supports, as for example columns 18 fastened to the base 10. In Figure 1 the wheel 12 is shown entirely above the upper surface of the base 10 but it is apparent that the wheel 12 may extend below the base 10 through an appropriate slot cut into the latter if desired. The shaft 14 to which the wheel 12 is fastened also has fastened to it a pulley 20. A drive motor 22 having a drive pulley 24 is also mounted on the base 10 and the pulley 24 is in alignment with pulley 20. Pulleys 20 and 24 are connected by a belt 26. Drive motor 22 is preferably an electric motor having a reduction gear to the pulley 24 and is adapted to drive the grinding wheel 12 at a speed appropriate for the grinding and polishing operations to be performed. It is apparent that means other than a motor and belt may alternatively be employed to rotate the drum 12, or it may be rotated by hand as by means of a crank if desired.

A substantially rigid arm 28 is hinged to the base 10 by means of a hinge whose hinge axis is indicated by numeral 30 shown in Figures 3, 4, and 5. The hinge is formed by a hinge plate 32 shown fastened to the base 10 at its left-hand edge, but it is apparent that the hinge may alternatively be constructed as an integral part of the base 10. Hinge plate 32 is located at a position on the base 10 so that arm 28 may be swung on the hinge and brought into cooperation with the grinding wheel 12 for the grinding and polishing operations. In order to facilitate bringing the arm 28 toward the periphery of the grinding wheel 12, a counterweight 34 may be fastened to a bell-crank extension 33 on arm 28. The counterweight 34 insures that when the arm 28 is brought into grinding relation with the grinding wheel 12 there will be an adequate and uniform pressure applied against the grinding wheel during the grinding operation. The hinge plate 32 has an extension at each end of the hinge and each extension is drilled and tapped for a pivot screw 36. The pivots 36 are made of hardened steel, and each is provided with a lock nut 38 as best seen in the enlarged view, Figure 5. A pivot rod 40 rotates on the pivots 36, each end of the rod 40 being provided with a ball-type pivot bearing 42 that is held in a counterbore by means of retaining ring 44. The pivot rod 40 has a rectangular keyway 46 milled in its outer surface parallel to its axis as best seen in Figure 4. The width of the keyway 46 is the same as the thickness of the arm 28, and the latter is held seated in the keyway 46 by means of screws 48 shown in Figure 5. Accordingly the plane of arm 28 will be parallel to the hinge axis 30. The mounting of the hinge plate 32 on the base 10 and the mounting of the bearing housings in which shaft 14 rotates on the base 10 are constructed so that the rotation axis 16 of wheel 12 is accurately parallel to the hinge axis 30.

The arm 28 may be trapezoidal in shape as best seen in Figure 3. At the narrow upper end of arm 28 a parallel-sided keyway 50 is milled into the arm 28 on the face of the arm remote from the wheel 12. The base of the keyway 50 makes a slight angle to the face of the arm 28 as best seen in Figure 4. The keyway 50 is milled so that its center line is substantially at right angles to the bottom edge of the arm 28. An extension arm 52 accurately fits the keyway 50 and is provided with an elongated opening 54 through which a screw 55 passes to clamp the extension arm 52 on the arm 28 as shown in Figure 4. The extension arm 52 is drilled near its outer end for a screw 56. The screw 56 fits the tapped hole 17 in the bottom of the magnetic transducing head 1 which is thereby clamped to the extension arm 52. The dimensions of the extension arm 52 and the locations of the screw holes for screws 55 and 56, together with the angle of the keyway 50, are designed so that the center line 58 (Figures 2 and 4) of the screw 56 and magnetic head 1 intersects the axis 16 of the grinding wheel 12 when the magnetic head 1 contacts the grinding wheel 12. Most conveniently the right hand face of the extension arm 52 is made to be vertical when the magnetic head contacts the grinding wheel, in which event the center line 58 of the head is horizontal and is the same height above the bottom of base 10 as is the axis 16 of the grinding wheel. Adjustment is made by loosening screw 55 and moving the extension arm 52 to the proper height. The center line 58 is shown horizontal in Figures 2 and 4 but it is to be understood that the main criterion is that the center line 58 should intersect the axis 16 of the wheel 12 substantially at right angles.

When the magnetic head 1 (which is fastened to the extension arm 52 and the arm 28) is brought into position so that the head 1 touches the grinding wheel 12, contact between the head and the wheel occurs at the gap 5 of the head 1. By loosening screw 56 the head 1 may be rotated about the center line 58 and this rotation changes the angle between the sides of the gap 5 and the axis 16 of the grinding wheel. The adjustment of exact parallelism between the sides of the gap 5 and the axis 16 is made with the aid of a fixture which will now be described.

The arm 28 has milled on the face thereof facing the grinding wheel a parallel-sided rectangular keyway 60. The keyway 60 is milled with its center line accurately perpendicular to the lower edge of arm 28. Accordingly the center line of the keyway 60 will describe a plane surface when the arm 28 is rotated on its hinge axis 30, and this plane will be accurately perpendicular to the hinge axis 30. Accurately fitting into the keyway 60 is a fixture 62 made of electrically insulating material such as phenolic plastic. The fixture 62 has a tapped hole 64 provided with a thumb screw 66 which passes through an elongated hole 68 in the arm 28. A washer may be placed under the head of the screw as shown. The thumb screw 66 and its washer serve to clamp the fixture 62 on the arm 28. The fixture 62 is easily removed from the arm by removing thumb screw 66. Fixture 62 has near its upper end an opening 70 which is large enough to permit the magnetic head 1 to pass through with substantial clearance on all sides. Thus the head 1 may be rotated on its axis 58 while the fixture 62 is in place on the arm 28. The right-hand face of the fixture 62 has a keyway 72 milled into it. The center line of keyway 72 is accurately parallel to the side surfaces of fixture 62, so that when the fixture is in place on the arm 28 the center line of the keyway 72 will also describe a plane surface when the arm 28 is rotated on its hinge axis 30, and this plane will be accurately perpendicular to the hinge axis 30. At each end of the keyway 70 are metal clips 74 and 76 which are fastened in the keyway 70 by means of screws 78 and 79 as shown. Screws 78 and 79 are threaded into the fixture 62. The metal clips 74 and 76 fit closely in the keyway 72 and have at their ends facing each other a V-shaped groove exactly along the center line of keyway 72. Accordingly a line through the apex of the V-shaped grooves in the clips 74 and 76 will always lie in the same plane as the center line of keyway 72 and will describe a plane perpendicular to the hinge axis 30.

A fine wire 80 is tautly stretched between the screws 78 and 79 and rests in the V-shaped groove of each clip 74 and 76. The wire 80 is made of nonmagnetic electrically conducting material such as copper and is preferably provided with a thin film of insulation. The wire 80 may for example be No. 36 gauge enameled copper magnet wire. The wire is stretched taut when its ends are clamped under the screws 78 and 79. The fixture 62 is slightly tapered as indicated in Figure 4 so that it may be adjusted to bring the wire 80 close to the operating face of the magnetic transducing head 1. The wire 80 should not make electrical contact to the head 1. The geometry of the fixture 62 is made such that the wire 80 is substantially perpendicular to the center line 58. It is apparent that with the geometrical construction described above, the wire 80 will always lie in a plane surface for all positions of the arm 28, and this plane surface will be accurately at right angles to the hinge axis 30. The adjustments provided by the enlarged hole 54 in the extension arm 52 and the enlarged hole 68 in the arm 28, which respectively permit vertical adjustment of the magnetic head 1 and of the fixture 62, do not in any way alter the condition that wire 80 will always lie in a single plane perpendicular to the hinge axis 30. Accordingly these adjustments are made by first adjusting extension arm 52 so that the center line 58 passes through the axis 16 of the grinding wheel, and then the fixture 62 is moved up or down so that the wire 80 is nearly tangent to the operating face of the magnetic head 1.

The screws 78 and 79 are connected by means of leads 82 to a source of alternating current indicated as generator 84. The frequency used must be within the range of frequencies to which head 1 can respond. The current passed through the wire is of a magnitude sufficient to produce an observable signal in the magnetic head 1 but not sufficient to cause any appreciable heating in the wire 80. It is well known that a current carrying wire such as 80 develops a concentric magnetic field. When the magnetic gap 5 is perpendicular to the axis of the wire 80, this magnetic field will have no component affecting the magnetic head, i.e. it will cause no flux to pass through the body of cores 2 and 3, so that no signal will be produced in the coil 6. The sensitivity of the orientation adjustment of magnetic head 1 is increased by using a high frequency, and by having the wire 80 close to the operating face of the head. By way of example, 60 cycle house current of 150 milliamperes has been found satisfactory. The lead wires 7 from the magnetic head 1 are connected to an amplifier 86 and indicator 88. The indicator 88 may conveniently comprise a cathode ray oscilloscope with its horizontal deflecting plates connected to the source of A.-C. that energized the wire 80 and with its vertical deflecting plates connected to the amplified output of the magnetic head. It will be found that due to the magnetic field surrounding the current in wire 80 a signal will generally be induced in the magnetic head 1. It will be observed that the signal generated in the magnetic head 1 by the current in the wire 80 will depend on the orientation of the magnetic head about the center line 58. The orientation of the magnetic head is adjusted to a position of zero signal, in which case the wire 80 is accurately at right angles to the sides of the magnetic gap 5 in the magnetic head 1. The correct orientation of the head 1 is easily determined by observing the signal on the indicator 88 as the head is rotated on its center line 58. Upon reaching the orientation of zero signal, the screw 56 is tightened whereupon the head 1 is in an orientation such that the sides of the magnetic gap 5 are accurately perpendicular to the axis of wire 80, and therefore the sides of the magnetic gap 5 are parallel to the hinge axis 30. Inasmuch as the hinge axis 30 is parallel to the axis 16 of the grinding wheel, it follows that the sides of the magnetic gap 5 are also accurately parallel to the axis 16. The fixture 62 may now be removed, the head 1 disconnected from the indicator, and the arm 28 brought into a position so that the operating surface of the head 1 engages the grinding surface of the grinding wheel 12.

The arm 28 may now be swung so that the magnetic head 1 contacts the grinding wheel 12, contact taking place substantially at the point of tangency between the head and the wheel. A strip of fine polishing cloth is placed on the outer edge of the grinding wheel 12. Counterweight 34 provides appropriate pressure between the magnetic head and the polishing cloth, and by energizing the motor 22 the head may be ground or polished to any desired finish. Inasmuch as the magnetic head 1 is oriented so that the sides of its magnetic gap 5 are accurately parallel to hinge axis 30 which in turn is parallel to rotation axis 16, it follows that the sides of the magnetic gap 5 will be accurately parallel to the rotation axis 16 during the grinding operation. The grinding and polishing operations may then be performed in customary manner with the assurance that the cylindrical concavity which is ground in the operating face of the head is accurately parallel to the sides of the magnetic gap 5.

Whereas the invention has been described in an embodiment adapted to grind a cylindrical concavity in a magnetic transducing head to be used on a magnetic record that is wound on the outside of a drum, it is apparent that an embodiment adapted to grind a convex cylindrical surface on a magnetic head may be similarly constructed and would employ a cup-shaped grinding wheel and the magnetic head would contact the inside cylindrical surface of the cup. It is convenient in such an embodiment to provide an extension for the hinge axis 30 on which the arm 28 is mounted so that the arm 28 may be moved axially on the hinge axis in order to slide the arm and elements mounted thereon out of the cup-shaped grinding wheel. Alternatively the grinding wheel may be made axially slidable on its driving axis, the latter being provided with splines or a keyway in well-known manner.

What I claim as my invention is:

1. Apparatus for grinding a magnetic signal transducing head to a cylindrical surface which comprises a base, a cylindrical grinding wheel rotatable about the axis thereof mounted on said base, a hinge on said base, the axis of said hinge being parallel to the axis of rotation of said grinding wheel, an arm mounted on said hinge, support means on said arm supporting the transducing head, said support holding the transducing head so as to face said grinding wheel and providing rotation of the transducing head about an axis effecting rotation of the magnetic gap of the transducing head in contact with said grinding wheel, a removable fixture mountable on said arm and carrying a wire, mounting means holding said wire in an orientation such that upon movement of said arm on said hinge said wire defines a plane that is perpendicular to the axis of said hinge, and said mounting means holding said wire in proximity to the magnetic gap of the transducing head.

2. Apparatus for grinding a magnetic signal transducing head to a cylindrical surface which comprises a base, a cylindrical grinding wheel rotatable about the axis thereof mounted on said base, a hinge on said base, the axis of said hinge being parallel to the axis of rotation of said grinding wheel, an arm mounted on said hinge, support means on said arm supporting the transducing head, said support holding the transducing head so as to face said grinding wheel and providing rotation of the transducing head about an axis effecting rotation of the magnetic gap of the transducing head in contact with said grinding wheel, a removable fixture mountable on said arm and carrying a wire, mounting means holding said wire in an orientation such that upon movement of said arm on said hinge said wire defines a plane that is perpendicular to the axis of said hinge, said mounting means holding said wire in proximity to the magnetic gap of the transducing head, and means for connecting said wire to a source of electric current.

3. Apparatus for grinding a magnetic signal transducing head to a cylindrical surface which comprises a base, a cylindrical grinding wheel rotatable about the axis thereof mounted on said base, a hinge on said base, the axis of said hinge being parallel to the axis of rotation of said grinding wheel, an arm mounted on said hinge, support means on said arm supporting the transducing head, said support holding the transducing head so as to face said grinding wheel and providing rotation of the transducing head about an axis intersecting the rotation axis of said grinding wheel when the transducing head is in contact with said grinding wheel, a removable fixture mountable on said arm and carrying a wire, mounting means holding said wire in an orientation such that upon movement of said arm on said hinge said wire defines a plane that is perpendicular to the axis of said hinge, said mounting means holding said wire in proximity to the magnetic gap of the transducing head, and means for connecting said wire to a source of electric current.

4. Apparatus for grinding a magnetic signal transducing head to a cylindrical surface which comprises a base, a cylindrical grinding wheel rotatable about the axis thereof mounted on said base, a hinge on said base, the axis of said hinge being parallel to the axis of rotation of said grinding wheel, an arm mounted on said hinge, support means on said arm supporting the transducing head, said support holding the transducing head so as to face said grinding wheel and providing rotation of the transducing head about an axis intersecting the rotation axis of said grinding wheel when the transducing head is in contact with said grinding wheel, a removable fixture mountable on said arm and carrying a wire, mounting means holding said wire in an orientation such that upon movement of said arm on said hinge said wire defines a plane that is perpendicular to the axis of said hinge, said mounting means holding said wire in proximity to the magnetic gap of the transducing head, means for connecting said wire to a source of electric current, and means connected to the transducing head indicating the signal generated therein.

5. Apparatus for grinding a magnetic signal transducing head to a cylindrical surface which comprises a base, a cylindrical grinding wheel rotatable about the axis thereof mounted on said base, a hinge on said base, the axis of said hinge being parallel to the axis of rotation of said grinding wheel, an arm mounted on said hinge, support means on said arm supporting the transducing head, said support holding the transducing head so as to face said grinding wheel and providing rotation of the transducing head about an axis intersecting the rotation axis of said grinding wheel when the transducing head is in contact with said grinding wheel, a removable fixture mountable on said arm, mounting means holding said fixture on said arm, said fixture holding a taut wire in an orientation such that upon movement of said arm on said hinge said wire defines a plane that is perpendicular to the axis of said hinge, said mounting means holding said wire in proximity to the magnetic gap of the transducing head, means for connecting said wire to a source of electric current, and means connected to the transducing head indicating the signal generated therein.

6. Apparatus for grinding a magnetic signal transducing head to a cylindrical surface whose axis is parallel to the magnetic gap which comprises a base, a cylindrical grinding wheel rotatable about the axis thereof mounted on said base, a hinge on said base, the axis of said hinge being parallel to the axis of rotation of said grinding wheel, an arm mounted on said hinge, support means on said arm supporting the transducing head, said support holding the transducing head so as to face said grinding wheel and providing rotation of the transducing head about an axis intersecting the rotation axis of said grinding wheel when the transducing head is in contact with said grinding wheel, a removable fixture removably mounted on said arm, mounting means holding said fixture on said arm, said fixture holding a taut wire in an orientation such that upon movement of said arm on said hinge said wire defines a plane that is perpendicular to the axis of said hinge, said mounting means holding said wire in proximity to the magnetic gap of the transducing head, a source of alternating electric current connected to said wire, and indicating means connected to the transducing head indicating when the signal generated therein is a minimum.

7. Apparatus for grinding a magnetic signal transducing head to a cylindrical surface whose axis is parallel to the magnetic gap of the transducing head which comprises a base, a cylindrical grinding wheel rotatable about the axis thereof mounted on said base, an arm hinged to said base plate, the hinge axis of said arm being parallel to the rotation axis of said grinding wheel and in a location on said base plate permitting said arm to be brought into cooperation with the cylindrical surface of said grinding wheel, a parallel-sided groove in said arm, the sides of said groove lying in planes that are perpendicular to said hinge axis at all positions of said arm, a parallel-sided fixture snugly fitting said groove, a nonmagnetic wire mounted on said fixture parallel to the sides thereof and electrically insulated therefrom, mounting means on said arm supporting the transducing head on said arm with the operating surface of said transducing head in proximity to said wire, said mounting means providing for rotation of said transducing head about an axis parallel to the magnetic gap of the transducing head, means connected to said wire for passing an alternating electric current therethrough, and indicating means connected to said transducing head indicating when the signal generated therein is a minimum.

8. Apparatus for grinding a magnetic signal transducing head to a cylindrical surface whose axis is parallel to the sides of the magnetic gap of the magnetic head which comprises a base, a cylindrical grinding wheel mounted to rotate on its axis in bearings supported on said base, driving means mechanically connected to said grinding wheel rotating the same about the axis thereof, an arm, a hinge connecting said arm to said base, the axis of said hinge being parallel to the rotation axis of said grinding wheel and located so as to permit said arm to be brought into cooperation with the cylindrical surface of said grinding wheel, a parallel-sided groove in a surface of said arm facing said grinding wheel, the sides of said groove lying in planes that are perpendicular to the axis of said hinge at all positions of said arm, a removable parallel-sided fixture snugly fitting said groove, a nonmagnetic wire mounted on said fixture parallel to the sides thereof and electrically insulated therefrom, mounting means supporting the transducing head on said arm with the operating face thereof in proximity to said wire, said mounting means providing for rotation of said transducing head about an axis parallel to the magnetic gap of the transducing head and intersecting the rotation axis of said grinding wheel, means clamping said magnetic head in a desired orientation, means connected to said wire for passing an alternating electric current therethrough, and indicating means connected to said transducing head indicating when the signal generated therein is a minimum.

9. Apparatus for grinding a magnetic signal transducing head to a cylindrical surface whose axis is parallel to the sides of the magnetic gap of the magnetic head which comprises a base, a cylindrical grinding wheel mounted to rotate on its axis in bearings supported on said base, driving means mechanically connected to said grinding wheel rotating the same about the axis thereof, an arm, a hinge connecting said arm to said base plate, the axis of said hinge being parallel to the rotation axis of said grinding wheel and located so as to permit said arm to be brought into proximity with the cylindrical surface of said grinding wheel, a parallel-sided groove in a surface of said arm facing said grinding wheel, the sides of said groove being perpendicular to the axis of said hinge at all positions of said arm, a removable parallel-sided fixture snugly fitting said groove, a nonmagnetic wire mounted on said fixture parallel to the sides thereof and electrically insulated therefrom, mounting means supporting the transducing head on said arm with the operating face thereof tangent to said wire and in a location on said arm substantially tangent to said grinding wheel when said arm is swung into proximity with said grinding wheel, said mounting means providing for rotation of said transducing head about an axis parallel to the magnetic gap of the transducing head and intersecting the rotation axis of said grinding wheel, means for clamping said magnetic head in a desired orientation, means connected to said wire for passing an alternating electric current therethrough, and indicating means connected to said transducing head indicating when the signal generated therein is a minimum.

No references cited.